March 21, 1961 G. H. DOERRIES 2,975,648
ELECTRICALLY CONTROLLABLE SPRING CLUTCH AND
BRAKE FOR POWER TRANSMITTING DEVICE
Filed Sept. 28, 1959
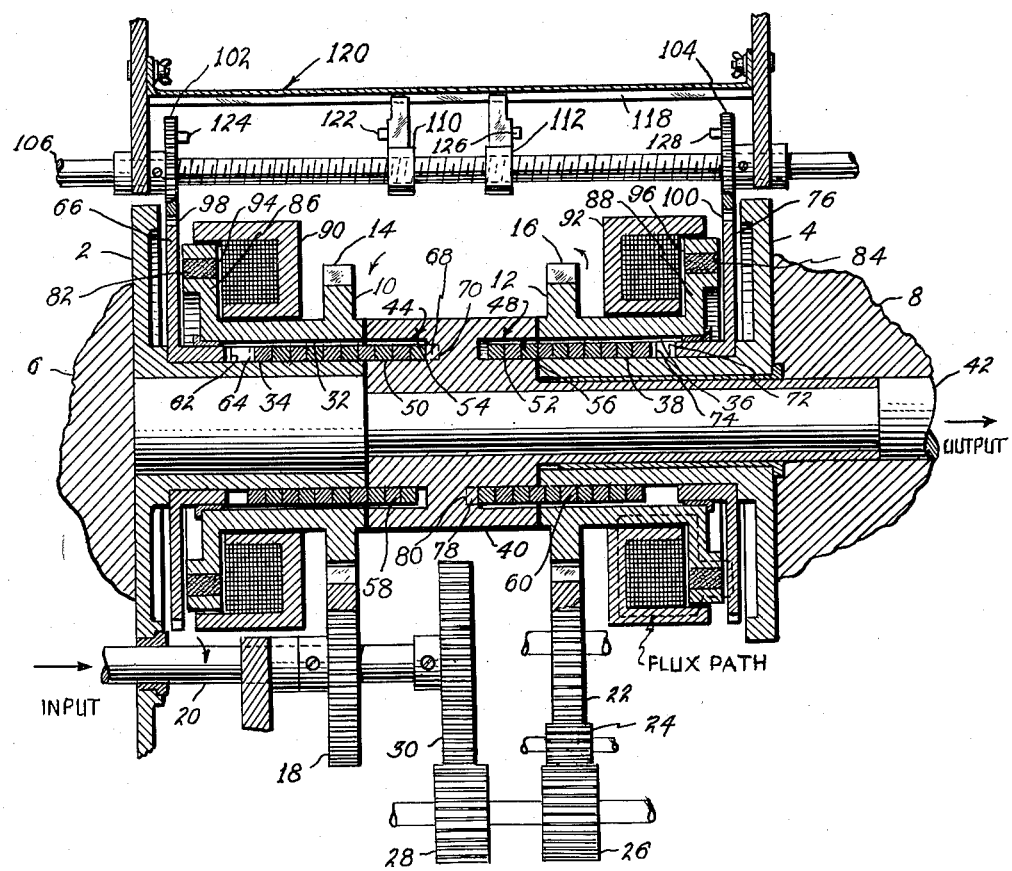
Inventor:
George H. Doerries
By: William V. Eby
Attorney United States Patent Office 2,975,648
Patented Mar. 21, 1961

2,975,648

ELECTRICALLY CONTROLLABLE SPRING CLUTCH AND BRAKE FOR POWER TRANSMITTING DEVICE

George H. Doerries, West Caldwell, N.J., assignor to Curtiss-Wright Corporation, a corporation of Delaware Filed Sept. 28, 1959, Ser. No. 842,852

8 Claims. (Cl. 74—377)

My invention relates to a power transmitting device having an output controlled according to the operation of spring clutch actuating means.

Power transmitting devices may incorporate spring clutches of the type comprising precision wound and ground helical springs, which tighten or loosen their grip on cylindrical surfaces in response to forces which tend to wind or unwind them. Inasmuch as spring clutches are fast acting they are particularly suitable for use in devices where an almost immediate response to a control signal is required. If such a clutch is constructed with the spring between inside and outside walls of concentric cylindrical members, the spring will engage the outer diameter of the inside member in response to a force tending to wind the spring and will engage the inside diameter of the outer cylindrical member in response to a force tending to unwind the spring. An arrangement of this sort is used in the device of the invention.

A prime object of the invention is to provide improved control means for regulating the operation of spring clutch actuating mechanism in a power transmission device whereby the device is rendered very sensitive to control action and a particular operative range is provided for.

Other objects and advantages of the invention will become apparent during a reading of the specification taken in connection with the accompanying drawing.

In the device of the invention a helical spring of rather precise dimensions is biased to engage surfaces of fixed structure and a rotatably mounted output member to thereby hold the output member against rotation in a particular direction. Rotatable actuating mechanism is provided for actuating the spring into contact with another surface of the output member and a surface of a rotatable input member such that the output member may be rotated by the input member through the spring. Magnetizable material is used in the construction of the actuating mechanism and input member to provide a path for magnetic lines of flux through them. Magnetic flux is established by the energization of an electromagnet which magnetically couples the actuating mechanism and input member without bringing them into contact. The input member acting through the magnetic coupling rotates the actuating mechanism which causes the spring to contact surfaces of the output and input members whereby the output member is rotated by the input member through the spring. By holding the actuating mechanism against the magnetic coupling force upon attainment of a particular position by the output member, the spring may be caused to assume its biased position in which the spring acts to hold the output member stationary. In this way, motion of the output member beyond a designated position may be prevented.

Referring to the drawing:

The single view shown is a vertical section taken through the device of the invention.

In the drawing reference characters 2 and 4 designate a pair of fixed cylindrical members secured in a suitable manner to stationary structure such as 6 and 8 respectively. Mounted for rotation about fixed members 2 and 4 are a pair of cylindrical input members 10 and 12 respectively. The input members 10 and 12 are rotated continuously at constant speed in opposite directions by a source of input power. As shown, the members 10 and 12 include the gears 14 and 16 respectively. The gear 14 meshes with the gear 18 on a shaft 20 driven by the input power source. The gear 16 is connected through the gear train including gears 22, 24, 26 and 28 with a gear 30 on the shaft 20. The input member 10 is rotated in a counterclockwise direction as viewed from the right in the drawing, through the gears 14 and 18, and input member 12 is rotated at the same speed in the other direction through gear 16 and the recited gear train. As shown, the inner cylindrical surface 32 of input member 10 is concentric with and spaced from the outer cylindrical surface 34 of fixed member 2. Similarly the inner cylindrical surface 36 of input member 12 is concentric with and spaced from outer cylindrical surface 38 of fixed member 4.

A cylindrical output member 40 is disposed between the fixed members 2 and 4 and the input members 10 and 12. Such output member 40 is rotatably mounted and has an axis of rotation in common with the axes of the fixed and input members. As shown, output member 40 is integral with output shaft 42. Output member 40 includes a pair of annular slots 44 and 48 which define inner cylindrical surfaces 50 and 52, and outer cylindrical surfaces 54 and 56. The surfaces 34, 50, 52 and 38 are all at the same radius from the common axis of the fixed and output members. Cylindrical surfaces 32, 54, 56 and 36 are also at equal radii from the common axis of the cylindrical members.

A precision wound and ground helical spring 58 is disposed between surfaces 34, 50; and surfaces 32, 54. Another such spring 60 is disposed between the surfaces 38, 52; and 36, 56. The normal inside diameter of the springs 58, 60, that is before the springs are assembled in the device, is less than the diameter of cylindrical surfaces 34, 50, 38 and 52. These springs, therefore, grip the surfaces of the fixed and input members in the device. Opposite ends of the springs are provided with tangs. One end of the spring 58 includes a tang 62 which is engageable by a projection 64 on an actuating member 66. The other end of the spring 58 includes the tang 68 which is confined in a slot 70 in output member 40. One end of spring 60 includes a tang 72 which is engageable by a projection 74 on an actuating member 76. The other end of spring 60 includes the tang 78 which is confined in a slot 80 in output member 40.

Magnetizable material is employed in the construction of input members 10 and 12, and actuating members 66 and 76 to provide a path for magnetic flux in adjacent input and actuating members. The input members and actuating members are conveniently constructed entirely of magnetizable material except for non-magnetic annular portions 82 and 84 in flanges 86 and 88 respectively of the input members. Electromagnets 90 and 92 are disposed adjacent to the flanges 82 and 84 respectively of the input members in the manner shown. Upon energization of one or the other of the electromagnets from a source of electrical energy, magnetic flux is established in input member 10 and actuating member 66, or input member 12 and actuating member 76, depending upon which of the electromagnets is energized. The flux magnetically couples the one or the other of the two pairs of actuating and input members together such that the actuating members of the coupled pair is caused to rotate at the speed and in the direction of the input member of such pair. An air gap 94 between the input member 10 and actuating member 66 is maintained during the energization of electromagnet 90, and an air gap 96 is maintained between input member 12 and actuating member 76 during energization of electromagnet 92.

Springs 58 and 60 are so wound that rotation of the actuating member 66 causes the projection 64 upon the actuating member 66 to engage the tang 62 of the spring 58 and unwind this spring, whereas rotation of the actuating member 76 causes projection 74 on the actuating member 76 to engage the tang 72 on the spring 60 causing the latter spring to be expanded. During the expansion of the spring 58 or of the spring 60 the ends fixed in the output member remain stationary, the inertia of the output member and integral output shaft, even in the absence of a load on the output shaft, acting to hold the tangs stationary. Expansion of the spring 58 causes the outer surface of the spring to engage the surfaces 32 and 54 of the input member 10 and output member 40 respectively, whereas expansion of the spring 60 causes the outer surface of this spring to engage surfaces 36 of input member 12 and the surface 56 of output member 40 respectively. The engagement of the spring 58 with input member 10 and surface 44 of the output member 40 causes rotation of the output member and shaft 42 in one direction, and the engagement of spring 60 with input member 12 and surface 48 of the output member 40 provides for the rotation of the output member and shaft 42 in the other direction. In the one instance the output member and shaft 42 are driven by the input member 10 through the spring 58 in the direction of rotation of member 10, and in the other instance the output member and shaft 42 are driven by the input member 12 through the spring 60 in the direction of rotation of the member 12. The output shaft is rotated in the direction of rotation of input member 10 for as long as the electromagnet 90 is energized and in the direction of rotation of input member 12 for as long as the electromagnet 92 is energized. Upon de-energization of the electromagnet 90 the actuating member 66 falls behind the rotating input member 10 permitting the spring 58 to contract and grip surface 50 of the output member and surface 34 of the fixed member 2 such that further rotation of the output shaft and output member 42 is prevented. De-energization of the electromagnet 92 results in the spring 60 contracting and gripping the surfaces 52 and 38 whereupon rotation of the output member and shaft 42 in the other direction is prevented.

When input member 10 drives output member 40 through the spring 58, output member 40 acts on the tang 78 of spring 60 in a direction to release the coils of spring 60 from tight engagement with surfaces 38 and 52 such that the spring 60 may rotate freely. Similarly when input member 12 drives output member 40 through spring 60, output member 40 acts on tang 68 of spring 58 to release the coils of spring 58 from tight engagement with surfaces 34 and 50 such that the spring 58 may freely rotate. Therefore, no interference results from the operation of the respective springs. A negative torque on the output shaft tends to wind one or the other of the springs according to the direction of the torque such that movement of the output shaft is prevented. Movement of the output shaft acting to move output member 40 in a counterclockwise direction as viewed from the right tends to wind spring 58, whereas movement of the output shaft acting to move member 40 in a clockwise direction tends to wind the other spring 60.

As shown, actuating members 66 and 76 are provided with gear teeth 98 and 100 which mesh with gears 102 and 104 respectively. The gears 102 and 104 are fixedly mounted on a rotatable shaft 106 which is threaded between the gears 102 and 104. A pair of travelling nuts 110 and 112 are mounted on the shaft. The nuts 110 and 112 include extensions 114 and 116 which ride in a channel 118 of a fixed member 120 extending parallel to the shaft 106. The shaft 106 is rotated in a clockwise direction as viewed from the right by actuating member 66 acting through gear teeth 98 and gear 102 when electromagnet 90 is energized, whereas shaft 106 is rotated in a counterclockwise direction by actuating member 76 when electromagnet 92 is energized. Clockwise rotation of shaft 106 moves the nuts 110 and 112 to the left until nut 110 attains an extreme position in which a tab 122 on nut 110 engages a tab 124 on gear 102. Engagement of the tabs prevents further rotation of the shaft 106 and results in actuating member 66 being held stationary through gear 102 and gear teeth 98 against the magnetic coupling force between the actuating member and input member 10. Counterclockwise rotation of shaft 106 moves the nuts to the right and causes tab 126 on nut 112 to engage tab 128 on gear 104 thereby stopping rotation of the shaft 106 and causing actuating member 76 to be held stationary through gear 104 and gear teeth 100 against the magnetic coupling force between actuating member 76 and input member 12. Holding actuating member 66 stationary at the end of a leftward movement of nut 110 results in spring 58 contracting to grip surfaces 34 and 50 of the fixed and output members 2 and 40 respectively such that counterclockwise rotation of shaft 42 is braked. Holding actuating member 76 stationary at the end of a rightward movement of nut 112 results in spring 60 contracting to grip surface 38 of fixed member 4 on surface 52 of output member 40 to brake clockwise rotation of the shaft 42. In this way limiting positions for the shaft 42 and a definite range of operation for the device are established.

The shaft 106 and fixedly mounted gears 102 and 104 function in preventing double clutch engagement, that is, in preventing the device from operating in a manner tending to drive the output member in two different directions at the same time. Assuming that it is desired to change the direction of rotation of the output member, one electromagnet must be de-energized and the other energized. If the changeover is accomplished in a very short interval of time both electromagnets will be effective during a transient period while flux decays in the de-energized electromagnet. The actuating members 66 and 76 are not rotated in opposite directions however because of the interconnection between them including shaft 106 and the gears 102 and 104. They, therefore, do not function to drivably connect both oppositely rotating input members to the output member at the same time. The actuating members rotate together first in the direction determined by the de-energized electromagnet and then in the direction determined by the energized electromagnet with the result that the output member is rotated for an inerval of time in the direction of rotation determined by the de-energized electromagnet and thereafter in the direction determined by the newly energized electromagnet.

While only one form of the device incorporating the features of the invention has been shown, it will be apparent that various changes and modification may be made therein by those skilled in the art without departing from the spirit and scope of the invention as set forth in the appended claims.

I claim:

1. A power transmitting device comprising a fixed member, a rotatable output member, a spring normally wrapped on said fixed and output members for holding the output member, a rotatable input member, means for driving the input member, a rotatable spring actuator, and means for magnetically coupling the actuator to the input member to thereby rotate the actuator and cause the actuator to expand the spring into contact with the input member and a surface of the output member whereby the output member is rotated by the input member through the spring.

2. A power transmitting device comprising; a fixed member; a rotatable output member; a spring normally wrapped on said fixed and output members for holding the output member; a rotatable input member including a portion of magnetizable material; a spring actuator at least a portion of which is of magnetizable material rotatable to a position in which the spring is caused to contact the input member and a surface of the output member whereby the output member is rotated by the input member through said spring; and an electromagnet for establishing a flux path through the magnetizable material of the input member and actuator to couple the actuator to the input member for rotation thereby to said position.

3. A power transmitting device comprising; a fixed member; a rotatable output member; a spring normally wrapped on said fixed and output members for holding the output member; a rotatable input member including a portion of magnetizable material; a rotatable spring actuator at least a portion of which is of magnetizable material for expanding the spring into contact with the input member and a surface of the output member, and maintaining such contact whereby the output member is rotated by the input member through said spring, said actuator being spaced from the input member; means for magnetically coupling the actuator to the input member for causing rotation of the actuator with the resultant expansion of the spring and rotation of the output member; and means for holding the actuator against the force of the magnetic coupling between the actuator and input member upon attainment of a limiting position by the output member whereby the spring is caused to contract to the normal position and hold said output member.

4. A power transmitting device comprising; a fixed member; a rotatable output member; a spring normally wrapped on said fixed and output members for holding the output member; a rotatable input member; a rotatable spring actuator for expanding the spring into contact with the input member and a surface of the output member, and maintaining such contact whereby the output member is rotated by the input member through said spring; means for magnetically coupling the actuator to the input member for causing rotation of the actuator with the resultant expansion of the spring and rotation of the output member; and means for holding the actuator at times against the force of the magnetic coupling between the actuator and input member whereby the spring is caused to contract to the normal position and brake said output member.

5. A power transmitting device as defined in claim 4 wherein the means for holding the actuator comprises a first member drivably connected to the actuator for rotation thereby, limiting means, and a second member translatable in accordance with the rotation of the first member for engaging the limiting means in an extreme position of its translation to thereby hold the first member and actuator.

6. A power transmitting device comprising fixed structure, a rotatable output member, a pair of springs normally wrapped on the fixed structure and said output member for holding the output member stationary, a pair of rotatable input members with at least a portion of each being of magnetizable material, means for driving the respective input members in opposite directions, a pair of rotatable spring actuators with at least a portion of each being of magnetizable material, means for magnetically coupling one actuator to one input member to rotate said one actuator and cause the actuator to expand one spring into contact with the one input member and a surface of the output member whereby the output member is rotated by the one input member through the one spring in one direction, and other means for magnetically coupling the other actuator to the other input member to thereby rotate said other actuator and cause the other actuator to expand the other spring into contact with the other input member and a surface of the output member whereby the output member is rotated by the other input member through the other spring in the other direction.

7. A power transmitting device as defined in claim 6 including means for holding one or the other of the spring actuators at times in opposition to magnetic coupling force between the actuator and the coupled input member whereby the one or the other of the springs respectively is caused to contract to a normal position and brake the output member.

8. A power transmitting device as defined in claim 7 wherein the means for holding the spring actuators includes a rotatable member drivably connected to the actuators for rotation thereby, a pair of limiting devices, and a pair of members translatable in accordance with the rotation of said rotatable member for engaging one or the other of the limiting devices in extreme positions of its translation to thereby hold the rotatable member and one or other of the actuators.

References Cited in the file of this patent

UNITED STATES PATENTS

| Re. 22,779 | Swift | Aug. 13, 1946 |
| 2,434,480 | Anderson | Jan. 13, 1948 |
| 2,569,586 | Small | Oct. 2, 1951 |
| 2,660,899 | McCammon | Dec. 1, 1953 |

FOREIGN PATENTS

| 526,314 | Great Britain | Sept. 16, 1940 |